United States Patent Office 3,400,815
Patented Sept. 10, 1968

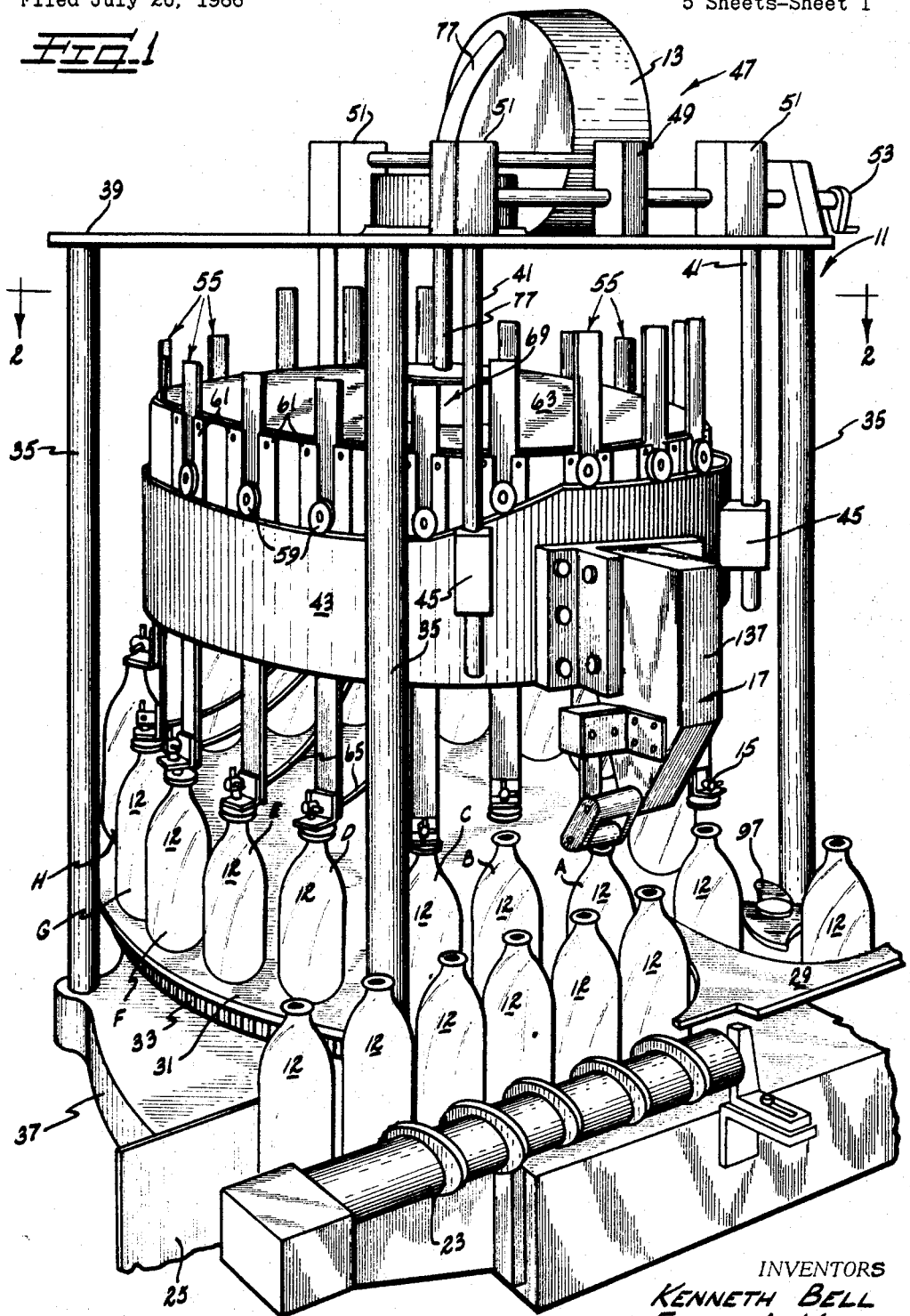

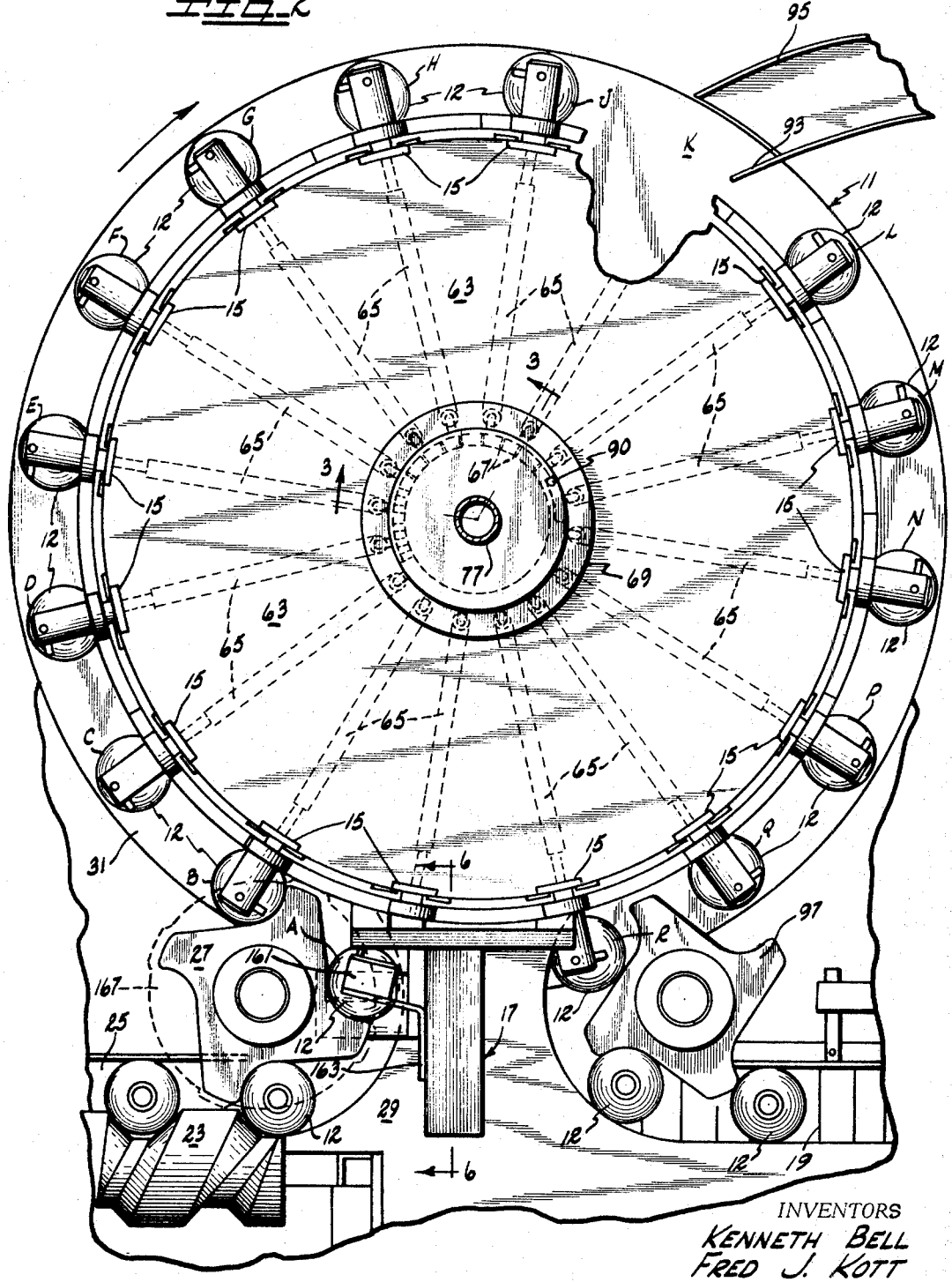

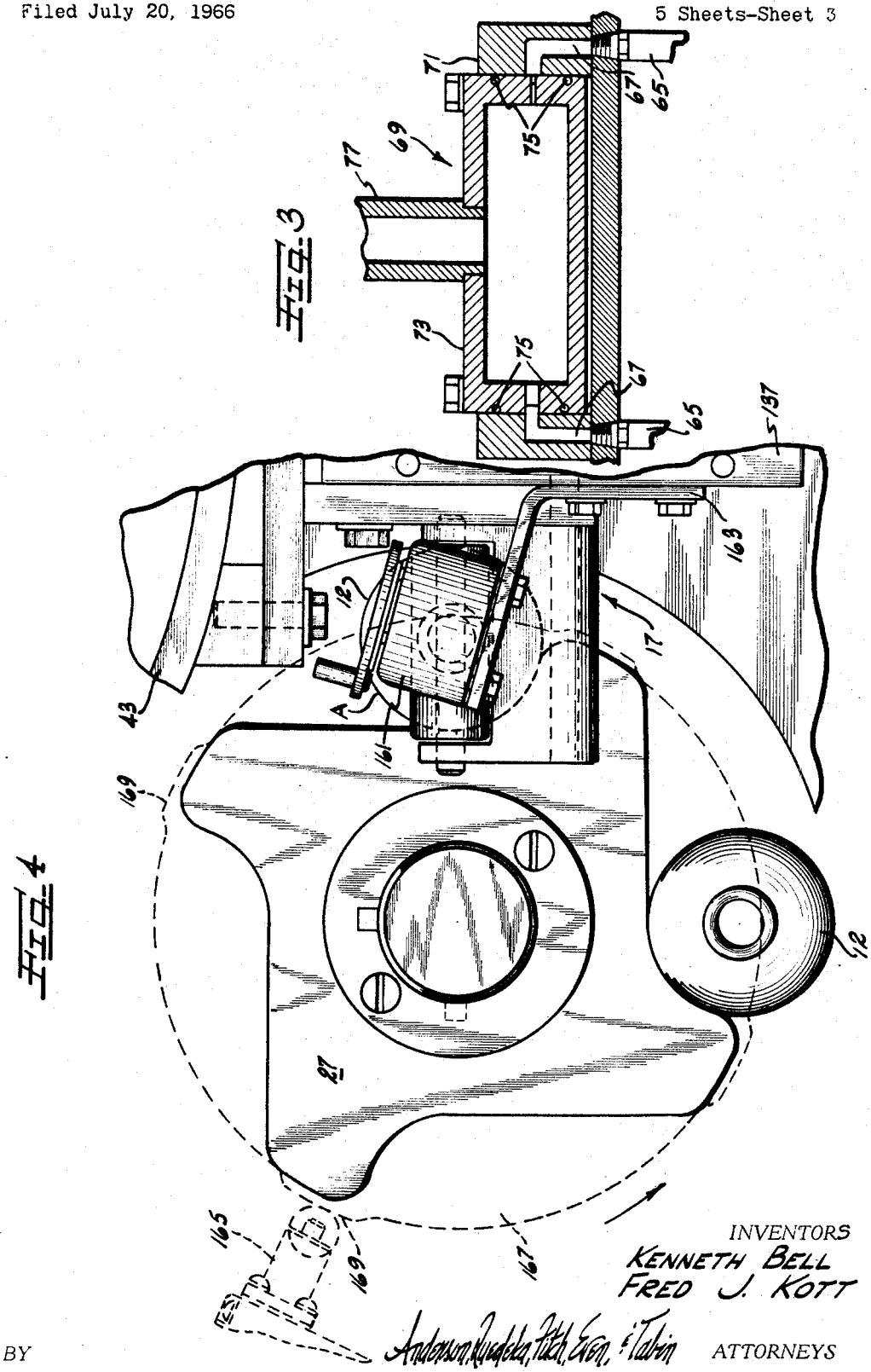

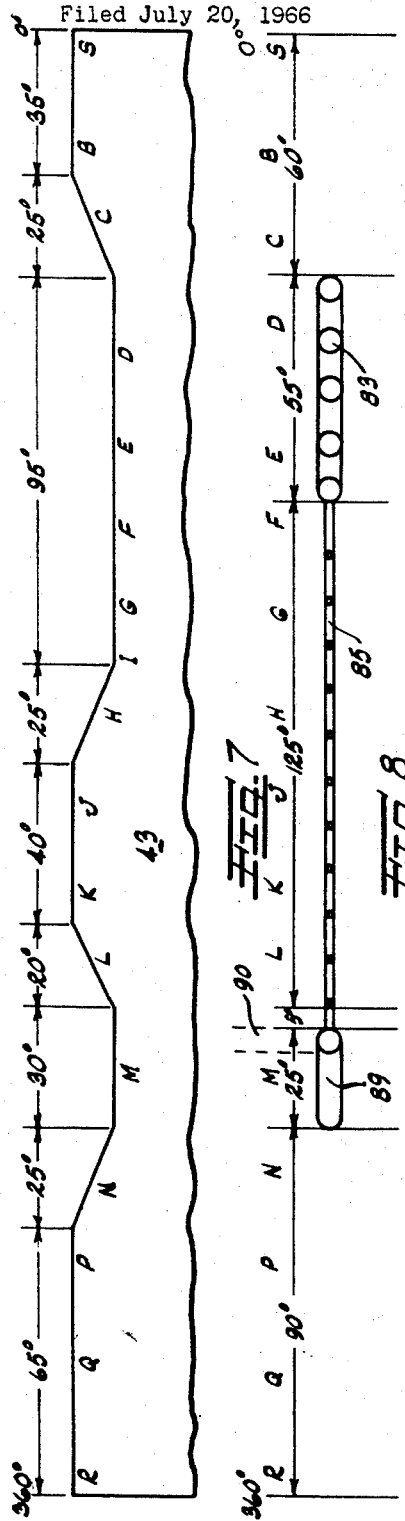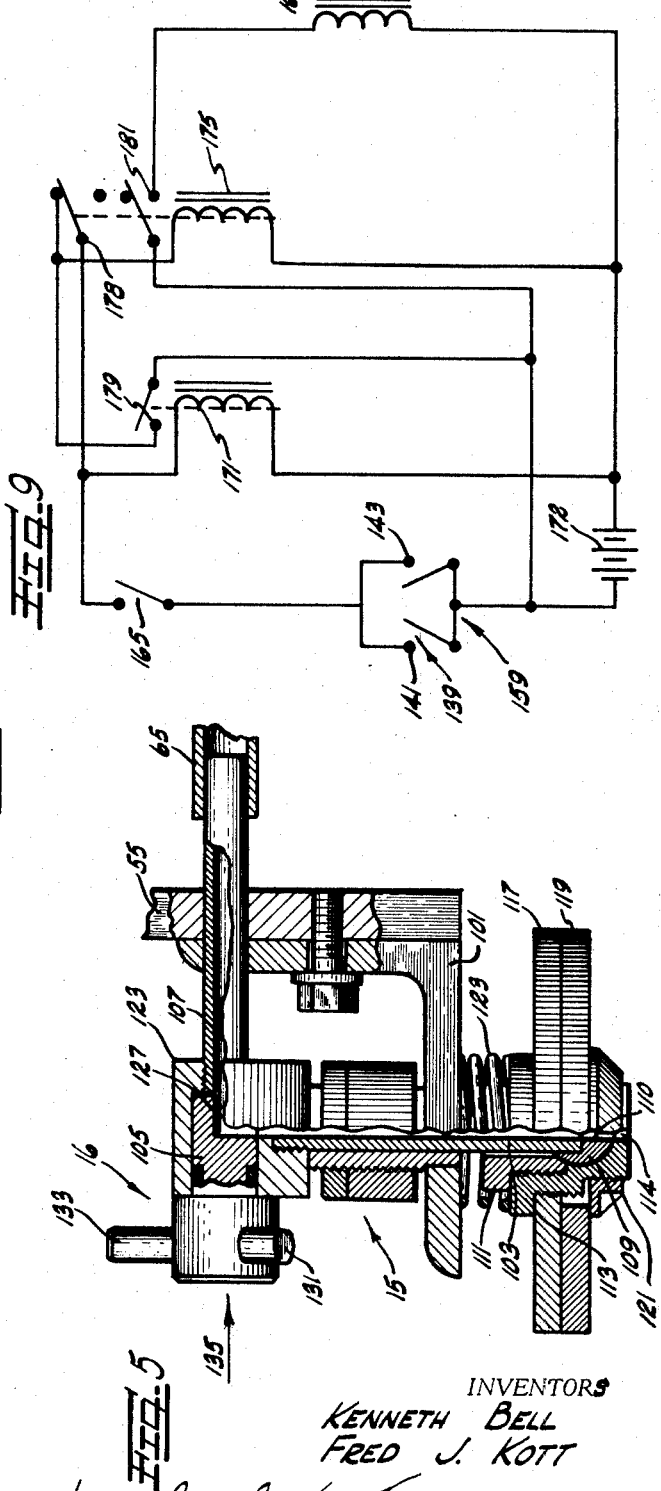

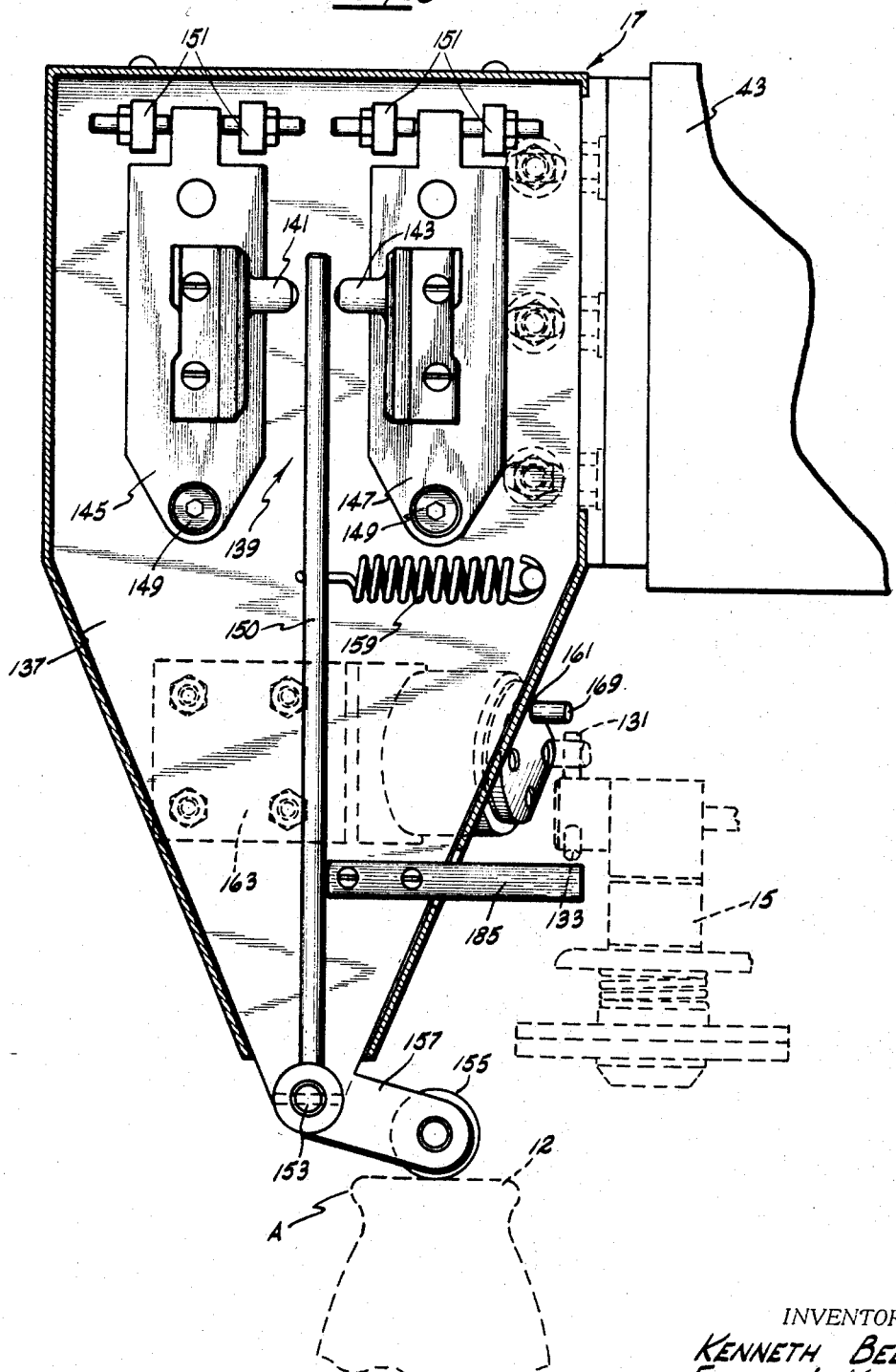

3,400,815
APPARATUS FOR TESTING CONTAINERS ACCORDING TO HEIGHT AND LIP SEAL
Kenneth Bell, Marengo, and Fred J. Kott, Park Ridge, Ill., assignors to National Dairy Products Corporation, New York, N.Y., a corporation of Delaware
Filed July 20, 1966, Ser. No. 566,611
12 Claims. (Cl. 209—73)

ABSTRACT OF THE DISCLOSURE

A bottle sorting apparatus wherein the bottles are tested and sorted for height and subsequently tested and sorted according to lip irregularities. The lips are tested by engaging them with a sealing head and evacuating the bottles with a vacuum means. The good bottles are then lifted off a conveyor whereas defective bottles which have a leaky seal at the lip remain on the conveyor and are subsequently discharged.

This invention relates generally to an apparatus for testing containers so as to detect the eistence of constructional defects and more particularly relates to an apparatus for testing a stream of conveyed containers for size and lip trueness and for separating from the acceptable containers those which fail to meet predetermined standards of quality.

The illustrated embodiment is particularly adapted for testing glass bottles and will be discussed in conjunction with such containers; however, it should be understood that other types of containers may be tested in accordance with this invention. Container manufacturing standards are usually relatively high; nevertheless, variations often exist with respect to size and quality. Further, during use, the lips of the bottles often become chipped. Such constructional defects become increasingly important when the bottles are to be filled and capped by automatic machinery. For example, should the bottle exceed or fall below a predetermined height, the machinery used for subsequent filling of the bottles may fail to operate or may operate improperly with a resulting waste and possible machine damage. Also, should the lip of the bottle be chipped or have other irregularities, the capping machinery may fail to adequately seal the bottle. Since filling and capping machinery generally is designed to operate in conjunction with a continuously conveyed stream of bottles, it is desirable that the testing apparatus be compatible with such operation.

A main object of this invention is to provide an apparatus for testing containers. A more particular object is to provide an apparatus for continuously testing containers for size and lip defects and for separating from the acceptable containers those failing to meet predetermined standards. A still further object is to provide an apparatus for continuously testing containers, such as bottles, for variations in vertical dimensions and for rejecting those which fail to conform to predetermined standards, and a still further object is to provide a container testing apparatus which is compatible with conventional capping and filling machinery.

Other objects and advantages of this invention will become apparent through reference to the following description and accompanying drawings which show an illustrative embodiment of this invention, in which:

FIGURE 1 is a pictorial view of an apparatus in accordance with this invention;

FIGURE 2 is a sectional view taken along the line 2—2 of FIGURE 1;

FIGURE 3 is an enlarged sectional view of a component of the apparatus taken along line 3—3 of FIGURE 2;

FIGURE 4 is an enlarged fragmentary top view of the vertical sensing mechanism and cooperating components which form a portion of the apparatus illustrated in FIGURE 1;

FIGURE 5 is a partial-section view of a sensing head included as a component of the apparatus illustrated in FIGURE 1;

FIGURE 6 is a sectional view of the vertical sensing mechanism taken along the line 6—6 of FIGURE 2;

FIGURE 7 is a developmental view of a cam sleeve comprising a component of the apparatus illustrated in FIGURE 1;

FIGURE 8 is an enlarged developmental view of a portion of the rotary vacuum valve illustrated in FIGURE 3; and, FIGURE 9 is a schematic diagram of an electrical control circuit for controlling the operation of the vertical sensing mechanism illustrated in FIGURE 5.

*General description*

Referring to FIGURE 1, the apparatus 11 is designed for automatically testing glass bottles 12 moving continuously along a conveyor. Although the following description is particularly directed toward the testing of glass bottles, it should be understood that various containers, e.g., cans may be tested in accordance with the features of this invention without departing from the spirit and scope thereof.

Briefly, a means including a vacuum pump 13 is provided for creating a vacuum within each of the bottles 12 and the acceptable bottles are temporarily lifted from the conveyor as they are advanced through the apparatus 11. A plurality of sensing heads 15 are connected to the pump 13. Each sensing head 15 includes a valve 16 and means for sensing the lip trueness of the bottles; so that, in the event a particular bottle fails to meet quality standards, the defective bottle will not be evacuated and therefore not lifted from the conveyor. Prior to operation of the valves, the vertical dimensions of the bottles 12 are successively tested at a first station by a height sensing means 17 when the bottle is in a position A along the conveyor. In the event a particular bottle fails to conform to predetermined height standards, the valve 16 corresponding to the defective bottle is closed to prevent evacuation and also lifting of the bottle. As the bottles progress through the apparatus, the acceptable ones meeting the predetermined standards are lifted by their corresponding valves above the surface of the conveyor as noted above. Correspondingly, the bottles having defects, i.e., those not evacuated, remain upon the conveyor and are removed at a second station from the table in a manner to be hereinafter more clearly described. The satisfactory bottles 12 are subsequently discharged from the apparatus 11 and positioned upon a discharge conveyor 19 for movement to other processing stations.

Referring to FIGURES 1 and 2, the bottles 12 are carried into a feed worm 23 by a feed conveyor 25. The bottles 12 are discharged from the feed worm 23 into the recesses of an input feed star 27. The feed star 27 and the worm 23 are cooperatingly geared so that as each bottle is discharged from the worm 23, a recess upon the star 27 will be positioned to receive the same and move the bottle into the apparatus 11. The star 27 and a guide 29 cooperate to move each bottle through the sensing position A and onto suitably supported rotary table 31 having an integral ring gear 33 driven by a motor (not shown).

The support structure of the apparatus 11 briefly includes four upright members 35 secured to a base plate 37 and supporting at the ends thereof an upper support plate 39. Suspended from the upper support plate by three vertically adjustable rods 41 is a cam sleeve 43 shown in development in FIGURE 7. The rods 41 are threaded through tapped blocks 45 secured to the outer surface of the cam sleeve 43 so that when the rods 41 are rotated by means of an adjusting means 47, the cam 43 may be raised and lowered as desired to accommodate various height bottles. The adjusting means 47 includes linkages 49 for coupling a plurality of similar gearing means 51 to a hand crank 53. Thus, when the crank 53 is rotated, the rods 41 which are threaded within the blocks 45 are correspondingly turned resulting in vertical movement of the cam sleeve 43.

The valves 16 are raised and lowered by the rises and falls upon the upper track of the cam sleeve 43. As illustrated in FIGURE 1, riding upon the upper track of the cam sleeve 43 are a plurality of vertically movable slides 55 each of which, for convenience of discussion, is associated with one of the positions which a bottle obtains while passing through the apparatus. Each of these positions are designated with a letter B through S inclusive. Secured to each slide 55 is a follower roller 59 which rides upon the upper surface of the cam sleeve 43. The slide 55 is held within guide channels 61 which are equally spaced and mounted about the outer surface of a cylindrical drum 63 which is geared for rotation with the table 31. As the drum 63 rotates with the table 31, the follower rollers 59 riding upon the stationary cam sleeve 43 vertically lift the sensing heads 15 with respect to the surface of the table 31.

The sensing heads 15 are connected by tubing 65 to ports 67 of a rotary vacuum switch 69. As illustrated in FIGURE 3, the rotary vacuum switch 69 comprises an outer sleeve 71 secured to the drum 63 for rotation with the table 31. Positioned coaxially within the sleeve 71 is a hollow stationary hub 73 the outer surface of which is in sealing relation with the inner surface of the sleeve 71 by means of seals 75. The cavity of the hub 73 is connected by a pipe 77 to the vacuum pump 13.

The tubing 65 is connected to the ports 67 which are spatially positioned about the sleeve 71. As the sleeve 71 is rotated with respect to the hub 73, the ports 67 are selectively placed into and out of communication with the hub cavity and, correspondingly, the pump 13. Referring to the developmental view of the outer surface of the hub 73 shown in FIGURE 8, the port 67, corresponding to position C of the apparatus, is placed in communication with the pump 13 through a wide vacuum groove 83. As the groove progresses around the hub, it is reduced in size as at 85, to permit maintenance of a vacuum in a bottle yet prevent overload of the pump 13 should a bottle fail to be picked up as will be more clearly discussed hereafter. The vacuum created within each bottle is released through an exhaust groove 89 which is ported as at 90 upwardly to atmosphere. Briefly, as the sleeve 71 turns in relation to the hub 73, each of the ports 67 is successively placed in communication with the hub cavity through the wide groove 83 thereby rapidly evacuating the respective bottle. The vacuum is maintained within the bottle during that portion of movement along the restricted groove 87 after which the bottle is placed in communication with the exhaust groove 89 thereby abruptly releasing the vacuum to atmosphere. Thus, by means of the rotary vacuum switch 69, each of the ports 67 is successively switched to the pump 13 and then ported to the atmosphere. The letters of FIGURE 8 correspond to the positions of the apparatus illustrated in FIGURE 2. As the bottles 12 pass through the input feed star 27 their vertical dimension is sensed by the height sensing means 17. In the event the bottle which is in position A exceeds or falls below a predetermined height, the valve 16 of its corresponding sensing head 15 is closed, by a means to be described, thereby interrupting communication with the vacuum pump 13, whereas, if the bottle is within height tolerances, the valve will remain open. The bottles are subsequently positioned upon the table 31 and their corresponding sensing heads 15 are dropped into seating engagement therewith. As the table rotates, the slides 55 and rollers 59 are lifted by a rise upon the cam 43 thereby lifting the sensing head 15 and its corresponding evacuated bottle above the table 31, and over a plow 93. Nonstandard bottles within which a vacuum has not been created will not adhere to the valve and therefore will remain upon the table and be removed by the plow 93 and discharged into a cullet chute 95. After passing above the plow, the accepted bottles are lowered to the table as the roller 59 drops into a cam fall and the vacuum therein is released through the port 90. Finally, the sensing head 15 is lifted from the bottle and the bottles removed by a discharge star 97 onto the discharge conveyor 19 for subsequent processing.

*Valve assembly*

As previously mentioned, the sensing head 15 is carried by the slide 55 as it is vertically shifted in response to the upper surface of the cam sleeve 43. Referring to FIGURE 5, the sensing head 15 is secured to the slide 55 by means of a mounting angle 101. The head includes a vertical exhaust tube 103 rigid with the angle 101 and communicating with the vacuum tubing 65 through a movable element in the form of a conduit 107. Secured to the lower end of the tube 103 is a ball 109 having a passage 110 therethrough aligned with the passage of the tube. A threaded collar 111 is loosely positioned about the tube 103 and rests upon the upper surface of the ball 109. As illustrated, the outer surface of the collar is threaded for mating engagement with the threaded surface of a socket 113 thereby providing a case about the ball 109. The socket 113 includes an opening 114. A metal backing washer 117 and a vacuum pad 119 constructed of rubber or other resilient material is held against the washer 117 by a retaining nut 121. The diameter of the retaining nut 121 is slightly less than the opening provided in the mouth of a standard bottle. Thus, should the mouth opening of the bottle upon which the head 15 is seated be less than standard the nut will interfere with proper seating of the pad 119. To maintain the pad 119 generally parallel with relation to the top of the bottle, a coil spring 123 is seated between the angle 101 and the socket 113 as illustrated in FIGURE 5.

The resilient pad 119 is intended to engage the bottles and as the head 15 is lowered onto the lip of a bottle, the resilient pad engages the lip and will be depressed under the spring pressure so as to fill slight chips in the bottle lip; however, large chips will not be filled since the resiliency of the pad is limited so as to provide an imperfect seal between the pad 119 and the mouth of the bottle should the chip exceed a predetermined size. The resiliency of the pad 119 may be varied to meet the desired quality standards.

In the event the plane of the lip of the bottle is nonparallel to the base of the bottle, the vacuum pad 119, backing washer 117 and socket 113 will tilt slightly about the ball 109 an amount determined by the clearance between the collar 111 opening and the diameter of the tube 103. However, should the plane of the bottle mouth exceed a predetermined amount, the socket 113 will be unable to tilt sufficiently to compensate therefor thus providing an imperfect seal between the bottle 12 and the sensing head 15. It should be noted that the aforementioned clearance may be adjusted to meet desired quality standards.

The sensing head 15 further includes a valve housing 123 into which the tube 103 and conduit 107 are threaded. The plug 105 constitutes a movable valve element within the housing and is provided with a right angle passage 127 having one leg continuously aligned with the conduit 107 and another leg movable into and out of communication with the vertical tube 103 as the plug is rotated. The plug is rotatably sealed within the housing 123 and provided with an opening pin 131 and a closing pin 133. The longitudinal axes of the pins form an angle of approximately 120°. When the axis of the pin 133 is parallel to the axis of the tube 103, as shown in FIGURE 5, the valve will be open; a deflecting force applied to pin 133 will cause the plug 105 to rotate counterclockwise as viewed along line 135 positioning the axis of the pin 131 parallel to the axis of tube 103 thereby interrupting communication between the conduit 107 and tube 103 closing the valve. In this position a deflecting force applied to pin 131 causing the plug 125 to rotate clockwise, as viewed along line 135, will reopen the valve restoring communication between the bottle and the vacuum pump 13. The pins 131 and 133 are deflected by the height sensing means 17 in a manner described below.

*Height sensing means*

The height sensing means 17 which is illustrated in detail in FIGURE 6 is supported upon a mounting plate 137 secured to the outer surface of the cam sleeve 43 and as previously mentioned is adjustable therewith by the adjusting means 47. The sensing means 17 includes a switch means 139 including high 141 and low 143 single pole, single throw microswitches. The microswitches 141 and 143 are mounted upon adjusting plates 145 and 147 respectively. One end of each plate is rotatably mounted upon a pivot 149 so that the position of switches 141 and 143 may be adjusted with respect to one end of a switch actuating lever 150 by means of adjusting screws 151. The switch lever 150 is in the form of a bell crank fulcrumed upon a pivot rod 153 secured to the plate 137. A roller 155 is journaled on the other end portion 157 of the lever. The lever 150 is biased toward switch 143 by a coil spring 159.

In operation, a bottle, when in position A, is below the sensing means 17 so that the top thereof is in contact with the roller 155. In the event the height of the bottle exceeds a predetermined value, the lever 150 will be deflected to the left, as viewed in FIGURE 6, thereby closing the high microswitch 141. Correspondingly, should the bottle height fall below the predetermined value or should no bottle be present, the lever 150 will be moved under action of the coil spring 159 to the right thereby closing the low microswitch 143. The switches 141 and 143 form part of a time delay control circuit 159 illustrated in FIGURE 9 which controls the operation of a rotary solenoid 161 mounted upon the plate 137 by means of a support bracket 163. This solenoid includes a pin 169 movable between two positions shown respectively in full and in phantom in FIGURE 6.

For reasons which will hereinafter be explained, it is desirable that the switch 139 control the circuit 159 and correspondingly actuate the solenoid 161 only during the time interval when a bottle is or should be in position A below the roller 155. To this end a roller actuated microswitch 165 and a cam wheel 167 are provided as illustrated in FIGURE 4. The cam wheel 167 is directly coupled for rotation with the feed star 27, and is formed with four raised dwell surfaces 169 corresponding to the four recesses of the star wheel 27. When the recess of the star is below the roller 155, i.e., a bottle is in position A, one of the raised dwell surfaces 169 will depress the roller switch 165 closing the switch, and connecting the switch 139 into the control circuit 159.

As previously mentioned, when the plug 105 of the sensing head 15 is in its open position, the closing pin 131 is vertical to the table 31. In this position, the path of the pin 131 passes through the phantom position of the solenoid pin 169 as shown in FIGURE 6. Should the bottle immediately below the roller 155 fail to conform to predetermined height standards, one of the switches 141 and 143 will close completing the circuit through the switch 165 ultimately actuating the solenoid 161. Upon actuation of the solenoid 161, the solenoid pin 169 will be moved to its phantom position and, as the valve is moved past the sensing means 17, will deflect the valve pin 131 thereby rotating and closing plug 105 of the valve 16 and disabling the sensing head which will ultimately be seated upon the bottle presently below the roller 155. It is noted from an observation of FIGURE 2 that the sensing head 15 will not be positioned for contact of its valve pin 131 by the solenoid pin 169 at the precise moment that its corresponding bottle is beneath the roller 155. Rather the bottle will be passed from beneath the roller 155 at the moment that the closing pin 131 is positioned for contact with the solenoid pin 169. Therefore, a time delay means is provided in the control circuit 159 so that the actuation of the solenoid 161 is delayed by approximately two seconds after either of the height sensing switches 141, 143 is closed.

*Control circuit*

The control circuit 159 is illustrated in FIGURE 9 and includes a "hold" relay 171 the coil of which is connected between the fixed contact of the switch 165 and the positive terminal of a direct current power supply 172. The negative terminal of the power supply 172 is connected through parallel connected switches 141 and 143 which are in series with the switch 165. The "hold" relay 171 incorporates a "long" coil which functions to hold the relay "in" about ½ second after power is removed therefrom. The approximate two second time delay for actuation of the solenoid 161 is provided by a double pole, double throw time delay relay 175 the coil of which is connected to the negative terminal of the power supply 172 through its normally closed contacts 178 and the normally open contact 179 of the relay 171. The remaining terminal of relay winding 175 is connected to the positive terminal of the power supply 172. The time delay relay 175 is of such construction that, after power is applied thereto, it will not pull "in" for approximately two seconds and will thereafter hold "in" as long as power is supplied to the coil. The rotary solenoid 161 is connected in a series circuit extending through normally open contacts 181 of relay 175 and the supply 172.

For purposes of discussion, it will be assumed that a bottle having excessively high vertical dimensions is below the roller 155. As previously mentioned, the microswitch 165 is closed by a raised dwell 169 in the cam wheel 167. Such a "high" bottle will cause the roller to deflect the lever 150 closing the sensing switch 141 and energizing the relay 171. The relay 171 upon the application of power pulls "in" and is held "in" through its contact 179 and the normally closed contact 178 of the relay 175. The bottle thereafter moves from below the roller 155 and the switch 165 is opened as the roller engages a lower dwell upon the cam surface 167. Power is applied to relay 175 through contacts 178 and 179 and after a time lapse of approximately two seconds, the relay 175 pulls "in" and the contact 181 close to complete a circuit for actuating the solenoid 161 to cause the pin 169 to assume the phantom position of FIGURE 6 for rotation of the valve plug 105 and disabling of the sensing head 15. When the relay 175 pulls "in," power is interrupted by opening of contacts 178; however, as previously stated, the relay 171 will hold "in" for approximately ½ second after its coil is de-energized; thereafter, the relay 171 will drop out opening contacts 179 and interrupting power to the relay 175, thus de-energizing the solenoid 161.

Briefly, a defective bottle 12 in position A will instantaneously close one of the switches 141, 143 and a raised dwell upon the cam wheel 167 simultaneously closes the switch 165, thereby completing the circuit to energize the relay 171. The bottle is then moved from below the roller 155 and the switch 165 is opened. After approximately two seconds, the relay 175 closes and the solenoid 161 is actuated positioning the pin 169 into obstructing relation with respect to the path of the valve pin 131. After the lapse of approximately ½ second the contacts 179 of relay 171 open causing the solenoid 161 and the relay 175 to return to their de-energized positions.

*Operation*

In operation, the bottles 12 are successively fed into the feed worm 23 and are discharged therefrom into the recesses of the feed star 27. The feed worm and the feed star are commonly geared so that a recess in the feed star will be positioned to receive a bottle as it is discharged from the feed worm. As the bottle 12 is moved between the guide 29, by the star 27, the top of the bottle is brought into contact with the roller 155 at position A. For illustrative purposes, it will be assumed that the bottle 12 has been manufactured with its vertical dimensions below standard so that the low switch 143 is closed by the lever 150. As the bottle is below the roller 155, a rise upon the cam wheel 167 is brought into contact with the roller switch 165 thereby closing the switch. Closure of these switches results in energization of the relays 171 and 175. The bottle then passes from beneath the roller 155 and onto the table 31. As the bottle is passing onto the rotary table, the time delay relay 177, pulls "in" energizing the rotary solenoid 161 positioning the pin 169 into obstructing position with respect to the path of the closing pin 131 thereby deflecting the pin and turning the valve plug 105 to interrupt the connection of the sensing head 15 to the vacuum pump 13.

As the bottle moves with the rotary table 31, the disabled sensing head 15 is positioned above the bottle as in position B shown in FIGURE 1. As the bottle moves on to a further position D, the follower roller 59 engages a fall of the cam and the sensing head is lowered into engagement with the mouth of the bottle. Simultaneously, as illustrated in FIGURES 7 and 8, the head 15 is connected through the groove 83 to the vacuum pump 13. However, since the valve plug 105 has been turned to closed position, a vacuum will not be created within the bottle.

As the rotary table 31 rotates farther, the follower roller 59 rides upwardly along the cam 43 and, when approximately position H is reached, the head 15 is lifted from the mouth of the bottle. Since a vacuum has not been created within the bottle, the bottle continues to remain upon the table 31, and, as the table rotates the defective bottle is engaged by the plow 93 and moved thereby into the cullet chute 95 (FIGURE 2). In a similar manner, bottles of excessive height will be rejected. The previously disabled sensing head moves with the table and the valve plug 105 is opened by an opening member 185 projecting from the support plate 137 as illustrated in FIGURE 5. In the closed position of the plug, the axis of the valve pin 133 is parallel to the axis of the plug and thus contact with the member 185 repositions the plug in its open position.

For purposes of discussion, it will be assumed that the bottle under consideration was constructed within standard height tolerances and thus passed below the roller 155 without actuating the solenoid 169. As the table 31 rotates the head 15 is seated upon the lip of the bottle. It will be assumed that the lip of the bottle contains a defect in the form of a chip. Thus, as the sensing head engages the bottle in position D, it will not seat properly and the vacuum pump 13 will fail to evacuate the bottle due to the sealing failure caused by the chip. When the head 15 is lifted by the slide 55 as it follows a rise upon the cam 43, the bottle will remain upon the table 31 and be removed therefrom by the plow 93. Similarly a sealing failure will occur in the event the mouth of the bottle is excessively tilted or the bottle is excessively cracked. In order to avoid an excessive load upon the pump 13 due to such a sealing failure, the groove of the rotary vacuum valve 69 is reduced at position F and the pump thereby is subjected to a reduced load for a short period of time.

Further, let it be assumed that the bottle under consideration is free from defects. When in position A, neither of the height sensing switches 141, 143 will be closed to actuate the solenoid 161 and the valve pin 131 will remain in its vertical position. When the bottle reaches approximately position C the sensing head 15 will seat thereon and the bottle will be evacuated quickly. At position J, the bottle will be lifted over the plow 93 as the slide 55 is lifted by a rise in the cam 43. At position L, the bottle will be returned to the table 31 and vented to atmosphere through the groove 89 and the port 90. The head 15 is then lifted from the bottle as at position P, and the acceptable bottle is moved by the discharge star 97 to the discharge conveyor 19.

Thus, an apparatus has been provided for automatically separating defective bottles from a continuous flow of conveyed bottles.

Although but one specific embodiment of this invention has been herein shown and described, it will be understood that the details and construction shown may be altered without departing from the spirit of this invention as defined by the following claims.

We claim:

1. An apparatus for continuously testing a plurality of conveyed containers comprising a conveyor for moving said containers along a path through first and second stations, said first station including means for automatically sensing a selected characteristic of said conveyed containers, said sensing means providing a signal corresponding to a predetermined characteristic of the container being tested, a vacuum pump, a plurality of sensing heads connected to said pump and including valves each having selective open and closed positions, and means moving each of said heads into engagement with the mouth of one of said containers so as to create a vacuum within the container when the associated one of said valves is in its open position thereby causing the evacuated container to become attached to and move with the head, the position of said valve of each of said heads being determined by the signal from said sensing means and said second station being spaced from said first station and including means for physically separating the evacuated and non-evacuated containers into two groups.

2. An apparatus in accordance with claim 1 wherein said sensing means measures a dimension of said containers and comprises a switch means and a member which is brought into contact with said container being tested, said switch means forming part of an electrical control circuit which provides said output signal which corresponds to the dimension of the container being tested and controls the position of each of said valves so that a vacuum will be created within the corresponding container when a predetermined dimensional standard is met.

3. An apparatus in accordance with claim 2 wherein said control circuit comprises a rotary solenoid including an obstructing member having a first position and a second position, said valve includes a deflectable part for changing the position of said valve, said part being engaged by said obstructing member when the latter is in said second position so that when said rotary solenoid is actuated, said obstructing member will engage said part thereby changing the position of said valve.

4. An apparatus in accordance with claim 3 wherein another station along said path beyond said second station includes an actuating member engageable with said deflectable part of each of said valves which have been closed by said solenoid deflecting member and operable to shift the part to open the valve.

5. An apparatus in accordance with claim 1 which includes a cam means cooperating with each of said sensing heads to shift the same vertically and into and out of engagement with said containers as they move along said path, said cam means having a surface for lifting said heads and their respective evacuated containers above said conveyor, removal means at said second station positioned in obstructing relation to the path of said containers on said conveyor, whereby said evacuated containers are lifted above said removal means as their respective heads follow said rise on said cam and said unevacuated containers are removed from said conveyor by said removal means.

6. An apparatus in accordance with claim 5 which includes a rotary vacuum valve controlling the communication between each of said valves and said vacuum pump so as to interrupt the communication between the valve and the pump and to vent the interior of said containers to atmosphere as the containers move along said path beyond said second station.

7. An apparatus in accordance with claim 6 which includes means for lifting said sensing heads above their respective containers subsequent to said second station and means for discharging such containers from the apparatus.

8. An apparatus for automatically testing a plurality of containers conveyed along a fixed path for the presence of lip and structural defects comprising a vacuum pump, a plurality of sensing heads having individual connections with said vacuum pump, means for moving each of said heads into cooperative engagement with the mouth of one of said containers, each of said heads having a sealing member adapted to accommodate limited lip irregularities of its corresponding container so that when such limit is exceeded the seal between said sensing heads and its corresponding container will be ineffective, and means for physically separating the evacuated and non-evacuated containers into two groups, said sensing head including a deflectable connector connecting said sealing member with the body of said sensing head, said connector permitting limited movement of said sealing member with respect to the body of said sensing head so as to permit adaptation to the mouth of a slightly tilted container yet preventing the creation of a vacuum within those containers wherein the tilt of the container mouth exceeds a predetermined amount.

9. An apparatus in accordance with claim 8 which includes a cam means cooperating with each of said sensing heads to shift the same vertically and into and out of engagement with the mouth of each of said containers as they move along said path, said cam means having a surface for lifting said heads and their respective evacuated containers above said conveyor, removal means at said second station positioned in obstructing relation to the path of said containers whereby said evacuated containers are lifted over said removal means as their respective heads follow said cam rise and said unevacuated containers are removed from said conveyor by said removal means.

10. An apparatus in accordance with claim 1 wherein each of said heads is provided with a sealing member adapted to accommodate limited lip irregularities of its corresponding container so that when such limit is exceeded the seal between said sensing head and its corresponding container will be ineffective, and means for physically separating the evacuated and non-evacuated containers into two groups.

11. An apparatus in accordance with claim 10 wherein said sensing head includes a deflectable connector connecting said sealing member with the body of said sensing head, said connector permitting limited movement of said sealing member with respect to the body of said sensing head so as to permit adaptation to the mouth of a slightly tilted container yet preventing the creation of a vacuum within those containers wherein the tilt of the container mouth exceeds a predetermined amount.

12. An apparatus in accordance with claim 10 which includes a cam means cooperating with each of said sensing heads to shift the same vertically and into and out of engagement with the mouth of each of said containers as they move along said path, said cam means having a surface for lifting said heads and their respective evacuated containers above said conveyor, removal means at said second station positioned in obstructing relation to the path of said containers whereby said evacuated containers are lifted over said removal means as their respective heads follow said cam rise and said unevacuated containers are removed from said conveyor by said removal means.

References Cited

UNITED STATES PATENTS

| | | | |
|---|---|---|---|
| 2,106,407 | 1/1938 | Hensley | 73—45.3 |
| 2,432,871 | 12/1947 | Fedorchak et al. | 73—45.3 |
| 3,206,026 | 9/1965 | Fouse et al. | 209—90 |

ALLEN N. KNOWLES, *Primary Examiner.*